Dec. 29, 1925.
I. F. PFEIFFER
1,567,982
BRAKE MECHANISM FOR AUTOMOBILES
Filed Dec. 24, 1924     3 Sheets-Sheet 1
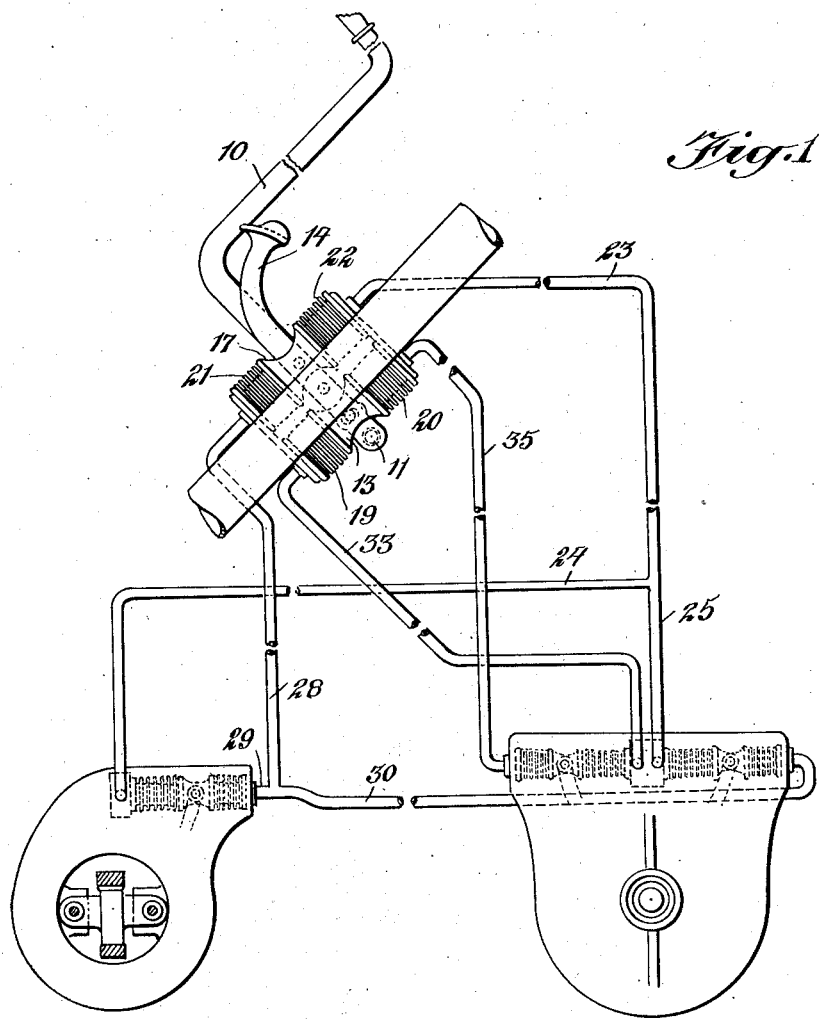
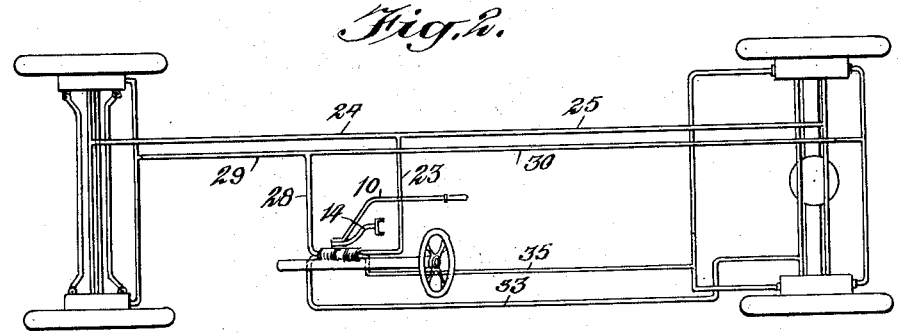
WITNESSES
INVENTOR
I. F. Pfeiffer
BY
ATTORNEYS

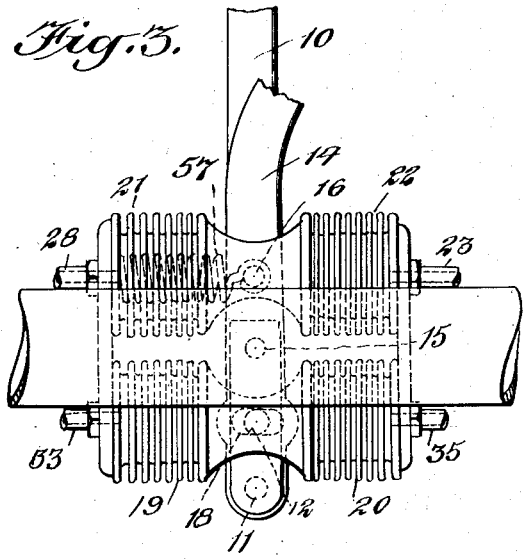
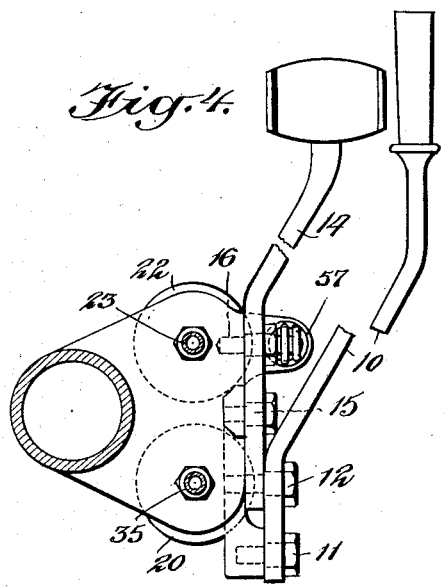
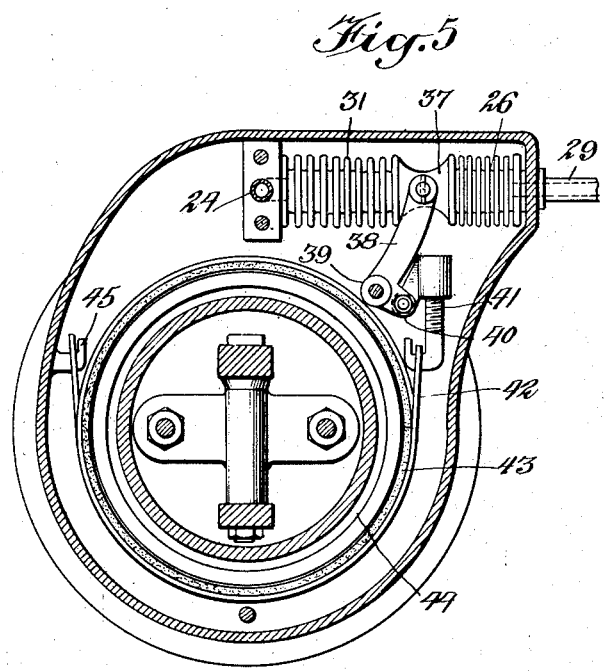
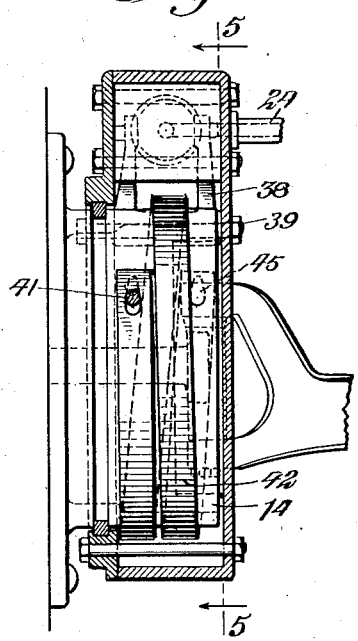

Dec. 29, 1925.

I. F. PFEIFFER 1,567,982

BRAKE MECHANISM FOR AUTOMOBILES

Filed Dec. 24, 1924

WITNESSES

INVENTOR
I. F. Pfeiffer
BY
ATTORNEYS

Patented Dec. 29, 1925.

1,567,982

UNITED STATES PATENT OFFICE.

ISADORE FRANCIS PFEIFFER, OF ALTOONA, PENNSYLVANIA.

BRAKE MECHANISM FOR AUTOMOBILES.

Application filed December 24, 1924. Serial No. 757,804.

*To all whom it may concern:*

Be it known that I, ISADORE FRANCIS PFEIFFER, a citizen of the United States, and a resident of Altoona, in the county of Blair and State of Pennsylvania, have invented a new and Improved Brake Mechanism for Automobiles, of which the following is a full, clear, and exact description.

This invention relates to a brake mechanism for automobiles. An object of the invention is to provide operating means between the ordinary foot brake pedal and the emergency lever of an automobile and the four wheels of the car, whereby upon the operation of the foot pedal the brakes will be simply and efficiently applied; and whereby upon the operation of the emergency brake lever, not only the service brakes will be applied, but the emergency brakes as well.

Another object is to provide simple and efficient means whereby the foot brake can be operated independently of the emergency brake but whereby the emergency brake cannot be operated without causing the operation of the foot brake mechanism.

A further object concerns the provision of simple and efficient means whereby the foot brake mechanism and the emergency brake mechanism, except for the pedals themselves, are independently connected as far as the hydraulic circuits are concerned.

The invention is illustrated in the drawings, of which—

Figure 1 is a simple diagrammatic elevational view of the system;

Fig. 2 is a diagrammatic plan view;

Fig. 3 is a partial side elevation of the operating cylinders in their relation to the operating pedals and levers;

Fig. 4 is a transverse section through the parts shown in Fig. 3;

Fig. 5 is a transverse section through a front wheel of the car on the line 5—5 of Fig. 6;

Fig. 6 is a longitudinal section through a front wheel;

Figure 7:
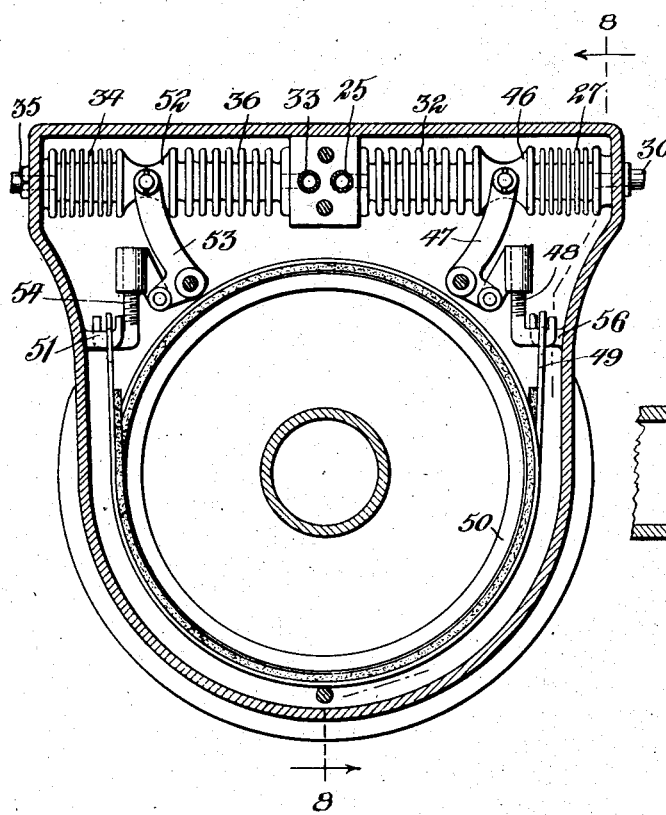
Fig. 7 is a transverse section of the rear wheel of the car, taken on the line 7—7 of Fig. 8.
Figure 8:
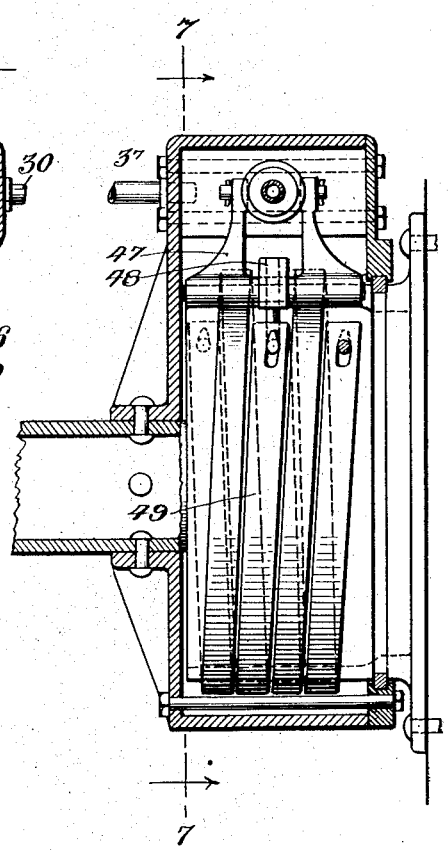
Fig. 8 is a longitudinal section taken on the line 8—8 of Fig. 7.

The form of the invention shown in the drawings is a preferred form, although it is understood that modifications in the construction and arrangement of the parts and in the character of the materials used may be adopted without departing from the spirit of the invention as set forth in the appended claims.

In its general aspect the invention relates to the establishment of hydraulic means for operating brakes on all four wheels of an automobile. It also relates to the establishment of auxiliary emergency brakes on the rear wheels. The ordinary service brakes on the four wheels are operated through an hydraulic circuit which is independent of the hydraulic circuit for operating the auxiliary emergency brakes. The service brakes are operated though a foot pedal. The emergency brakes are operated through the emergency brake lever. This pedal and lever are so related that the pedal can be operated independently of the lever but the lever cannot be operated without actuating the pedal, so that when the emergency brakes are applied, the service brakes are also applied, this action resulting in the application of six brakes, two on the front wheels and four on the rear wheels, giving a very effective braking action.

The preferred form of the invention as shown in the drawings comprises an emergency brake lever 10 pivoted at 11 and carrying a stub shaft 12 connected to a block 13. A foot pedal 14 is pivoted at 15 and carries a stub shaft 16 connected to a block 17. The lower end of the pedal 14 is slotted, as shown at 18, to permit the stub shaft 12 to have a certain amount of movement without affecting the pedal 14.

The block 13 is connected to adjacent ends of collapsible cylinders 19 and 20 of any standard type. The block 17 is connected to adjacent ends of collapsible cylinders 21 and 22 of similar types. The other ends of these cylinders are fixed. Fluid, preferably oil, is contained within these cylinders. A pipe 23 extends from the cylinder 22 and leads to two branch pipes 24 and 25 which connect, respectively, to cylinder 31, associated with the front wheels, and cylinder 32 associated with the rear wheels of the automobile. A pipe 28 connects to branch pipes 29 and 30 leading, respectively, to cylinder 26, associated with the front wheels, and cylinder 27 associated with the rear wheels.

A pipe 33 extends from cylinder 19 to a cylinder such as 36 associated with the rear wheels, whereas a pipe 35 extends from cylinder 20 to a cylinder such as 34 associated with the rear wheels. The fluid in the cylinders 21 and 22 and 19 and 20 is in circuits which are independent of each other, so that as far as the condition of the fluid in these circuits is concerned a defect in one circuit will not affect the other circuit.

Considering the front wheels of the car, it will be noted in Fig. 5 that the cylinders 26 and 31 are connected to a block 37, the other ends of these cylinders being fixed in any suitable manner. This block is connected to an arm 38 of a bell crank lever pivoted at 39, the other arm 40 of the lever being connected to a hook 41. This hook receives a steel band 42 acting as a support for a brake lining 43 and which band is adapted to be wrapped around a brake drum 44. The other end of the band is connected to a fixed hook 45 on the casing or front axle housing of the automobile.

Referring to Fig. 7, the cylinders 27 and 32 are connected to a block 46. This block is connected to a bell crank lever 47 adapted to operate a hook 48 connected to the brake band 49 which is wrapped around the brake drum 50 in the usual manner, the other end of the band 49 being fixed to a stationary hook 51.

On each rear wheel the cylinders 34 and 36 are connected to a block operating a bell crank lever 53 connected to a hook 54. This hook is connected to a brake band 55 wrapped around the drum 50 and in turn connected at its other end to a fixed hook 56.

The invention, therefore, provides a single brake band on the front wheels operated through the intermediary of a foot pedal. It also provides similar bands on each of the rear wheels operated through a foot pedal. Additionally, however, on the rear brake drum there are provided auxiliary brake bands operated through the intermediary of the emergency brake lever 10.

In the operation of the device, if it is desired to apply the foot brakes, the pedal 14 is depressed. This depression contracts cylinder 21 and expands cylinder 22. The contraction of cylinder 21 will cause fluid to be forced into cylinders 26 and 27, causing the tightening of the service brake bands on all four drums. A release of the foot pedal will cause a spring 57 to return the foot pedal to normal position. By reason of the slot 18, the normal operation of the foot pedal will not affect any movement of the stub shaft 12 on the emergency brake lever 10.

However, when the emergency brake is to be applied, the lever 10 is pulled back, causing a contraction of cylinder 20 and the expansion of cylinder 19.

This action causes the forcing of fluid into cylinders 34 and the withdrawal of fluid from cylinders 36. This action will cause a binding of the emergency brake bands on the two rear wheels. At the same time, the movement of the emergency lever 10 beyond a definite amount will cause the engagement of the stub shaft 12 with the end of the slot 18, causing an operative movement of the brake pedal 14 which will, in the manner above described, cause the application of the service brakes on all four wheels. The pulling up of the emergency lever, therefore, will apply the brakes to all four wheels, and in addition will apply the emergency brakes to the rear wheels.

The device is simple and efficient; the fluid circuits are so independent that a slight defect in one will not be contributed to the other circuits. Barring a slight replenishment of the fluid over long periods of time, the system is simple and can be operated merely by the operation of the pedal and the lever.

What I claim is:—

1. A brake mechanism for automobiles having brake devices on all four wheels, which comprises fluid means for operating service brakes on each of the wheels, fluid means for operating emergency brakes on each of the rear wheels, a brake pedal for operating the service brakes through one of said fluid means, an emergency lever for operating the emergency brakes through the other fluid means, said fluid means being independent of each other, and means associated with the pedal and the lever permitting the independent operation of the pedal but causing the operation of the pedal whenever the lever is operated.

2. An automobile brake device, which comprises service brakes on each of the wheels, emergency brakes on the rear wheels, fluid cylinders associated with each of said brake devices, fluid circuits independently associated with the service brakes and the emergency brakes, a system to operate the fluid cylinders associated with each of said circuits, a brake pedal for operating the service fluid cylinders, an emergency lever for operating the emergency brake fluid cylinder, and means on the emergency lever to cause the additional actuation of the brake pedal when the emergency lever is operated.

ISADORE FRANCIS PFEIFFER.